(12) United States Patent
Moore et al.

(10) Patent No.: US 9,221,104 B2
(45) Date of Patent: Dec. 29, 2015

(54) CARPET WASTE COMPOSITE PRODUCT AND METHOD FOR MAKING SAME

(75) Inventors: David A. Moore, Dalton, GA (US); John J. M. Rees, Chattanooga, TN (US)

(73) Assignee: Columbia Insurance Company, Omaha, NE (US)

( * ) Notice: Subject to any disclaimer, the term of this patent is extended or adjusted under 35 U.S.C. 154(b) by 238 days.

(21) Appl. No.: 13/569,887

(22) Filed: Aug. 8, 2012

(65) Prior Publication Data

US 2013/0040092 A1 Feb. 14, 2013

Related U.S. Application Data

(60) Provisional application No. 61/521,115, filed on Aug. 8, 2011.

(51) Int. Cl.
| | | |
|---|---|---|
| *B32B 3/02* | (2006.01) |
| *B23B 27/06* | (2006.01) |
| *B32B 5/20* | (2006.01) |
| *B32B 27/18* | (2006.01) |
| *B32B 27/32* | (2006.01) |
| *B32B 27/36* | (2006.01) |
| *B32B 3/04* | (2006.01) |
| *B29C 33/26* | (2006.01) |
| *B29B 17/00* | (2006.01) |
| *B29L 31/00* | (2006.01) |

(52) U.S. Cl.
CPC ........... *B23B 27/065* (2013.01); *B29B 17/0042* (2013.01); *B29C 33/26* (2013.01); *B32B 3/04* (2013.01); *B32B 5/20* (2013.01); *B32B 27/18* (2013.01); *B32B 27/32* (2013.01); *B32B 27/36* (2013.01); *B29L 2031/712* (2013.01); *B29L 2031/7158* (2013.01); *B29L 2031/7322* (2013.01); *B32B 2250/03* (2013.01); *B32B 2250/24* (2013.01); *B32B 2607/00* (2013.01); *Y02W 30/62* (2015.05); *Y10T 428/233* (2015.01)

(58) Field of Classification Search
CPC ...... Y10T 428/33; B32B 5/18; B32B 27/065; B29B 17/0042; B29C 33/26
USPC .......................................................... 428/71
See application file for complete search history.

(56) References Cited

U.S. PATENT DOCUMENTS

| | | | |
|---|---|---|---|
| 6,972,144 B2 | 12/2005 | Roth et al. |
| 7,678,719 B2 | 3/2010 | Ogle et al. |
| 7,754,120 B2 | 7/2010 | Kessing |
| 7,923,477 B2 | 4/2011 | Murdock et al. |
| 2002/0119285 A1* | 8/2002 | Arnold et al. ................. 428/119 |
| 2004/0022996 A1 | 2/2004 | Jenkins |
| 2004/0045488 A1* | 3/2004 | Danzik et al. ................. 108/161 |
| 2005/0206029 A1 | 9/2005 | Moore et al. |
| 2006/0029775 A1* | 2/2006 | MacKinnon et al. ......... 428/141 |

(Continued)

FOREIGN PATENT DOCUMENTS

| | | |
|---|---|---|
| CA | 1112144 A1 | 11/1981 |
| GB | 1001566 A | 8/1965 |

(Continued)

*Primary Examiner* — Brent O'Hern
(74) *Attorney, Agent, or Firm* — Ballard Spahr LLP

(57) ABSTRACT

A composite building product formed through formed molding. The composite product having an exterior skin surrounding a foamed core. The exterior skin being formed from particulate material that includes carpet waste material and mixed polymer waste materials.

24 Claims, 4 Drawing Sheets

(56) References Cited

U.S. PATENT DOCUMENTS

| | | |
|---|---|---|
| 2006/0086817 A1 | 4/2006 | Kirchmer et al. |
| 2008/0075915 A1 | 3/2008 | Wening et al. |
| 2008/0128933 A1* | 6/2008 | Przybylinski et al. .......... 264/31 |
| 2009/0029097 A1 | 1/2009 | Riddle et al. |
| 2010/0272995 A1 | 10/2010 | Keating |
| 2011/0014431 A1 | 1/2011 | Fowler |
| 2011/0081516 A1 | 4/2011 | Stillwell et al. |

FOREIGN PATENT DOCUMENTS

| | | |
|---|---|---|
| GB | 1273554 A | 5/1972 |
| TW | I247835 B | 1/2006 |

\* cited by examiner

CARPET WASTE COMPOSITE PRODUCT AND METHOD FOR MAKING SAME

FIELD OF THE INVENTION

The present invention relates to a process for forming composite building products, in particular composite products having a layered construction comprising a continuous polymeric exterior skin enclosing a foamed interior core. In one aspect, it is contemplated that at least a portion of the foamed interior core and/or the exterior skin can comprise reclaimed carpet waste materials such as post consumer carpet waste and/or post industrial carpet waste.

BACKGROUND OF THE INVENTION

As one will appreciate, composite building products comprising natural and synthetic compositions, can be used in many applications ranging from residential and industrial construction, a multitude of consumer oriented goods, and many other industries requiring certain desired physical characteristics and properties such as, for example and without limitation, dimensional stability in varying thermal and moisture level conditions, varying levels of structural strength, graffiti resistance, recyclability, and other properties appropriate for the application of the particular composite product. Particular exemplary examples of applications for such composite building products can include, without limitation, hoarding boards for construction use, vertical and horizontal sheeting for structural construction, flooring systems, interior paneling such as countertops and bathroom stall walling, cladding construction products, non-sheet building product, sculpted facia, sculpted cladding; posts, columns, and the like.

Conventional processes for forming composite products that can have many of the desired properties include injection molding, extrusion, blow molding, and the like. However, conventional injection molding, blow molding, and extrusion processes have process and product limitations such as excessive weight of the formed composite product and an inability to use highly contaminated recycled materials, which limits cradle to cradle recyclability.

Waste material inflow into resource limited landfills is strained by the voluminous amount of post consumer carpet (PCC) waste produced by carpet distributors and carpet installation contractors and post industrial carpet (PIC) waste produced by carpet manufacturers. While most estimates indicate that carpet waste constitutes only 1 to 2% of all municipal solid waste, this amount still represents a vast quantity of waste that can have a substantial economic and environmental impact.

The carpet waste inflow into landfills is not generally environmentally beneficial. In an effort to mitigate the amount of carpet waste that is shipped to landfills, efforts are being made to manually recycle at least a portion of the carpet waste prior to insertion into the landfill waste stream. Recycling carpet, however, is difficult because its major components are chemically and physically diverse.

Reclaimed carpet waste material has a unique advantage over other recycled materials in that it provides thermoplastic fibrous polymer sources and a high percentage of self contained filler materials within a single waste stream. Most carpets comprise about 20-50 percent weight face fiber, the remainder being backing materials, commonly polypropylene, and an adhesive which attaches the carpet fiber to the backing material. The adhesive typically comprises a carboxylated styrene-butadiene (XSB) latex copolymer, and inorganic filler like calcium carbonate. These materials are frequently incompatible with each other in a recycling operation. For example, the means used to separate and reuse a layer of the backing material might affect the usefulness of the pile material. Alternatively, a chemical used in the recycling process might dissolve two or more of the components, causing them to intermix and form a blend of the two materials having less desirable properties. The application of heat to melt certain materials can have the same effect. Because of these difficulties, to date the amount of carpet reclaimed through recycling operations is limited and only a minimal percentage of the total reclaimed carpet waste may be useful in the production of green technology products. Accordingly, there is a need for efficient recycling of post industrial and post consumer carpet waste to reduce the amount of waste being disposed of at landfills.

A further need is recognized for a scheme that makes effective and efficient use of the reclaimed materials in new composite products. The need for virgin material should be kept to a minimum, in order to decrease costs and increase the amount of old material that is converted into new carpeting. In addition, such broad-based recycling methods can also potentially help to comport with National Sanitation Foundation (NSF) 140/2007 recommendations, which encourage carpet industries to develop sustainable carpet manufacturing and recycling programs for social, economic, and environmental benefits.

The need then is for a reclaimed carpet waste based, foamed composite building product that is light weight, fully recyclable at end of life, and able to incorporate highly contaminated raw material.

Related processes for production are also provided. Other systems, methods, features, and advantages of the system for producing the carpet waste composite product will be or become apparent to one with skill in the art upon examination of the following figures and detailed description. It is intended that all such additional systems, methods, features, and advantages be included within this description, be within the scope of the carpet waste composite product, and be protected by the accompanying claims.

SUMMARY

The present method for producing composite building products is suitable for use with materials produced from at least one reclaimed carpet waste stream. In operation, the invention relates to a process for forming composite building products, in particular composite building products having a layered construction that comprises a continuous polymeric exterior skin that encloses a foamed interior core. In one aspect, it is contemplated that at least a portion of the foamed interior core and/or the exterior skin can comprise reclaimed carpet waste such as post consumer carpet waste and/or post industrial carpet waste.

In one aspect, and as described in US Publication No. 2011/0081516 to Stillwell et al., which is incorporated in it's entirety by reference herein, a system and process for creating products using powder impression molding is provided that can efficiently produce composite building products as described herein. In this aspect, composite building products can be produced through the use of a machine having a pair of hingedly-connected female molds that can be heated and cooled and which can be clamped together. In operation, a reclaimed particulate material is placed into each mold when they are in an open position and the molds are heated until the reclaimed particulate material melts to form respective mold skins that line the interior cavity of each mold. An expandable filler material is then placed in one of the mold cavities and the two molds are clamped closed to form a completely closed cavity. As one will appreciate, the mold skins in the respective molds become integrally bonded together to form a continuous exterior skin that completely encases the filler material.

In various aspects, the reclaimed particulate material can comprise reclaimed carpet waste material and mixed plastic waste materials, such as, without limitation, HDPE, LDPE, PP, PET, and the like. In one aspect, the expandable filler materials comprise reclaimed carpet waste material and mixed plastic waste materials and can optionally comprise a chemical blowing agent (CBA). It is contemplated that non-melting fillers such as, without limitation, wood, inert fillers such as CaCO3, and the like can be added to the expandable filler material to form a portion of the interior core. Optionally, the composite building product can further comprise an aesthetic/wear layer and/or a base layer, which can be an adhesive or insulating layer. In certain embodiments, the aesthetic/wear layer and the base layer can be formed or otherwise configured to be suitable for use in similar or identical applications.

Additional embodiments of the invention will be set forth, in part, in the detailed description, figures, and claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

The accompanying drawings, which are incorporated in and constitute a part of this specification, illustrate several embodiments of the invention and together with the description, serve to explain the principals of the invention. Moreover, in the figures, like reference numerals designate corresponding parts throughout the different views.

DETAILED DESCRIPTION OF THE INVENTION

Figure 1:
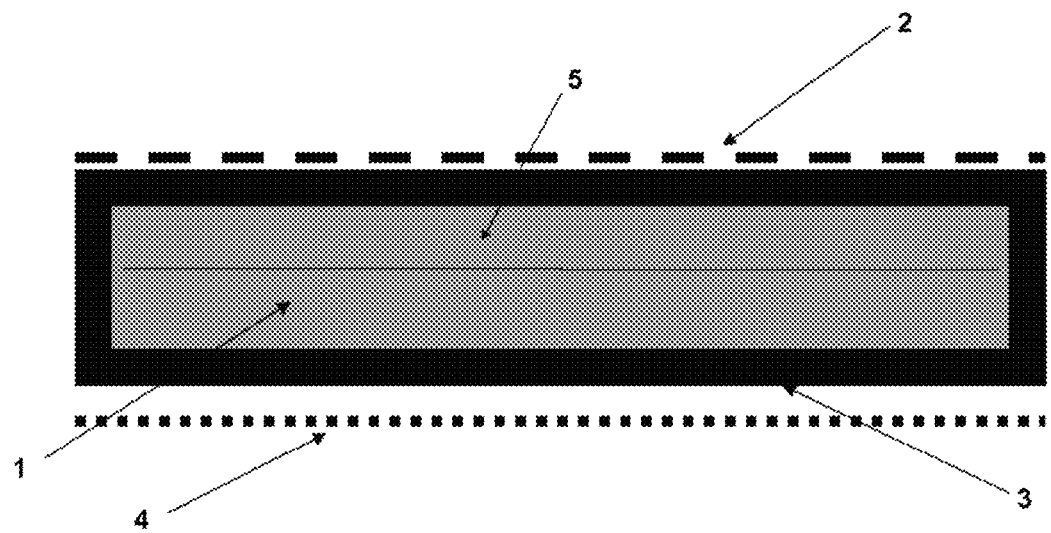
FIG. 1 is a schematic cross-sectional view of a formed composite product comprising an integral exterior skin comprising reclaimed carpet waste material and mixed plastic waste materials surrounding an interior foamed core comprising an expandable filler material. Optionally shown are an aesthetic/wear layer, a base layer, and a structural support layer.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to a "first particulate material" can include two or more such materials unless the context indicates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described system, component, event or circumstance may or may not occur, and that the description includes instances where system, component, event or circumstance is included and instances where it is not included.

Without the use of such exclusive terminology, the term "comprising" in the claims shall allow for the inclusion of any additional element—irrespective of whether a given number of elements are enumerated in the claim, or the addition of a feature could be regarded as transforming the nature of an element set forth in the claims. Except as specifically defined herein, all technical and scientific terms used herein are to be given as broad a commonly understood meaning as possible while maintaining claim validity.

References in the specification and concluding claims to parts by weight of a particular element or component in a composition or article, denotes the weight relationship between the element or component and any other elements or components in the composition or article for which a part by weight is expressed. Thus, in a composition or a selected portion of a composition containing 2 parts by weight of component X and 5 parts by weight component Y, X and Y are present at a weight ratio of 2:5, and are present in such ratio regardless of whether additional components are contained in the composition.

A weight percent of a component, unless specifically stated to the contrary, is based on the total weight of the formulation or composition in which the component is included.

As used herein, and unless the context clearly indicates otherwise, the term carpet is used to generically include broadloom carpet, carpet tiles, and even area rugs. To that "broadloom carpet" means a broadloom textile flooring product manufactured for and intended to be used in roll form. "Carpet tile" denotes a modular floor covering, conventionally in 18"×18," 24"×24" or 36"×36" squares, but other sizes and shapes are also within the scope of the present invention.

As used herein, and unless the context clearly indicates otherwise, the term "carpet waste" is used to generically include post consumer carpet (PCC) waste produced by carpet distributors and carpet installation contractors which be, for example, used carpet, e.g., carpet removed from a home, apartment complex, or a commercial installation, or unused carpet, e.g., residual carpet left from an installation or manufacturing process and post industrial carpet (PIC) waste produced by carpet manufacturers, which can include, for example, commercial, industrial and residential carpet waste; manufacturing remnants; quality control failures, and the like. Thus, as used herein, "reclaimed carpet waste material" refers generally to any material obtained from a prior manufactured carpet product.

The reclaimed carpet waste material can comprise any material that is conventionally used in carpet manufacturing. For example, the reclaimed carpet waste material can be synthetic, such as, for example a material comprising one or more of a conventional nylon, polyester, polypropylene (PP), polyethylene (PE), polyurethane (PU), polyvinyl chloride (PVC), polyethylene terephthalate (PET), polytrimethylene terephthalate (PTT), latex, styrene butadiene rubber, or any combination thereof. It is contemplated that the conventional nylon of the reclaimed carpet material can be, for example and without limitation, nylon 6/6, nylon 6, nylon 10, nylon 10/10, nylon 10/11, nylon 11, and the like. Additionally, the reclaimed carpet waste material can comprise natural fibers, such as cotton, wool, or jute. In exemplary embodiments, the reclaimed carpet material can comprise one or more biodegradable materials, including, for example and without limitation, polylactic acid (PLA). According to embodiments of the invention, a reclaimed carpet waste material comprising synthetic and/or natural materials described above can optionally be present as a reclaimed carpet fiber. Any one or more of the above disclosed reclaimed carpet waste materials can be obtained from various component parts of the prior manufactured carpet product, for example and without limitation, a reclaimed carpet waste material can be obtained from a face layer, an adhesive layer, a backing layer, a secondary backing layer, an underlayment, a cushioning material, a reinforcing layer, or a scrim.

Additionally, the reclaimed carpet waste material can also comprise fillers. The fillers can be any suitable filler, including, for example and without limitation, aluminum oxide trihydrate (alumina), calcium carbonate, calcium sulfate, calcium silicate, magnesium carbonate, magnesium oxide, magnesium hydroxide aluminum trihydrate, alumina, hydrated alumina, aluminum silicate, barium sulfate, barite, flyash, glass cullet, glass fiber and powder, metal powder, clay, silica or glass, fumed silica, talc, carbon black or graphite, fly ash, cement dust, feldspar, nepheline, zinc oxide, titanium dioxide, titanates, glass microspheres, chalk, or mixtures thereof. Among these, preferred fillers comprise calcium carbonate, barium sulfate, talc, silica/glass, alumina, and titanium dioxide, or mixtures thereof. It is contemplated that the fillers can be virgin filler, waste material, or even reclaimed fillers. Examples of recycled fillers include coal fly ash and calcium carbonate. In another aspect, the filler can be ignition resistant and can include, for example and without limitation, antimony oxide, decabromobiphenyl oxide, alumina trihydrate, magnesium hydroxide, borates, and halogenated compounds. Among these ignition resistant fillers, those that comprise alumina trihydrate and magnesium hydroxide are preferred.

As one will appreciate, the reclaimed carpet waste material can be obtained from a variety of sources. In one example, the reclaimed carpet waste material can be obtained from a collection site. Approximately 50 collection sites are positioned throughout the United States. These collection sites take in post consumer carpet which is then shipped to a facility for sorting according to fiber type. Once sorted, baled material of primarily the same or similar fiber type is then shipped to a secondary location where various techniques are employed for reducing the large pieces of carpet to small chunks or shredded fiber and to provide an amalgamated mixture. The amalgamated mixture will typically contain face fibers, primary backing, secondary backing, carpet binder and, in some cases, attached cushion. After this stage, the amalgamated mixture can be used with or without further refinement or processing to remove additional contaminates.

For use in connection with various embodiments of the present invention and, dependant on the end use and desired cost of the product, reclaimed carpet waste material can comprise a relatively coarse blend of ground or shredded post consumer carpet (PCC). Optionally, and according to some embodiments, the reclaimed carpet waste material can for example comprise relatively coarse slit tape fibers derived from reclaimed primary and secondary backing materials. The coarse material is able to provide a low-cost structural material that can serve as reinforcement for molded products. In some embodiments, additional processing steps can be desirable. For example, the post consumer carpet waste material can be further chopped or sheared into any desired size, including for example, fiber or tape yarn lengths in the range of from about 1/64" to about 3".

According to certain embodiments, the fibrous material present within the reclaimed carpet material exhibits a substantially uniform size, including substantially uniform liner density measured in denier units and substantially uniform fiber lengths. However, in alternative embodiments, fibers present within the reclaimed carpet material can have non-uniform linear densities and non-uniform fiber lengths. According to these embodiments, a population of reclaimed carpet fibers having non-uniform linear fiber densities can, for example, have individual linear fiber densities in the range of from about 1 to about 1,500 denier per filament (DPF). Still further, a population of reclaimed carpet fibers having non-uniform linear density can collectively provide an average linear fiber density that is, for example, greater than 1 DPF, greater than 10 DPF, greater than 50 DPF, greater than 100 DPF, greater than 500 DPF, greater than 1,000 DPF, or even greater than 1,500 DPF.

In addition to fibrous reclaimed carpet waste material described above, it should be appreciated that reclaimed carpet material can further comprise one or more impurities. For example, representative impurities that can be present in reclaimed carpet material and thus present in the articles described herein include dirt, sand, oil, inorganic filler, and other conventionally known waste materials that can be present in reclaimed carpet waste material.

As used herein the term "mixed plastic waste materials" comprises plastic waste materials obtained from a variety of sources. For example, and without limitation, the mixed plastic waste materials can be one or more of recycled container materials, recycled plastic bottle waste materials, and virgin polymer materials. In various aspects, it is contemplated that each of the recycled container materials, the recycled plastic bottle waste materials, and the virgin polymer materials can comprises at least one polymeric material selected from the group comprising HDPE, LDPE, PP, PET, and the like.

The present invention may be understood more readily by reference to the following detailed description of preferred embodiments of the invention and the examples included therein and to the Figures and their previous and following description.

The present method for producing composite building products is suitable for use with materials produced from at least one reclaimed carpet waste stream. In operation, the invention relates to a process for forming composite building products, in particular composite building products 1 having a layered construction that comprises a continuous polymeric exterior skin 3 that encloses a foamed interior core 5, such as the composite building product that is schematically shown in cross-section in FIG. 1. In one aspect, it is contemplated that at least a portion of the foamed interior core 5 and/or the exterior skin 3 can comprise reclaimed carpet waste such as post consumer carpet waste and/or post industrial carpet waste.

Figure 3:
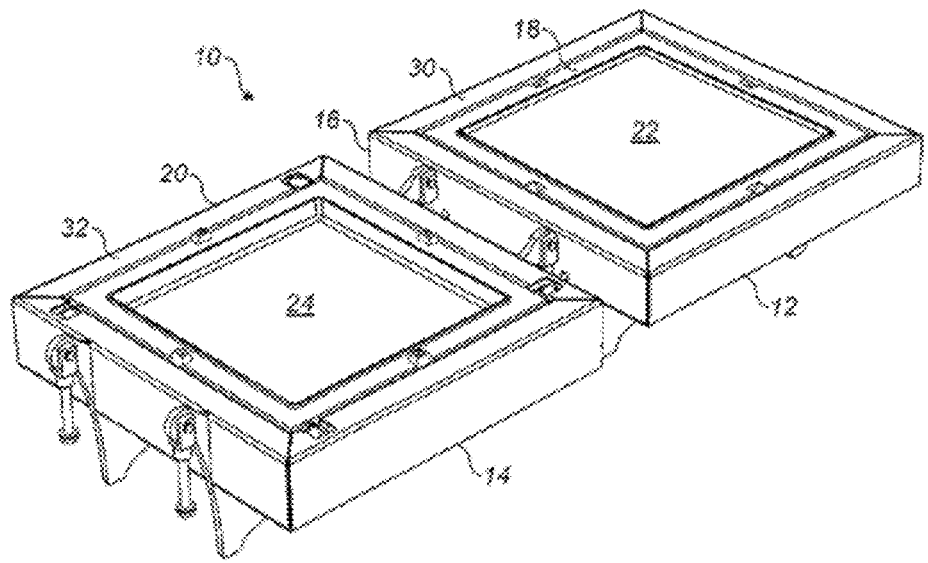
FIG. 3 is a perspective view of a molding machine in the open position for use in the method for producing the formed composite product of FIG. 1.
Figure 4:
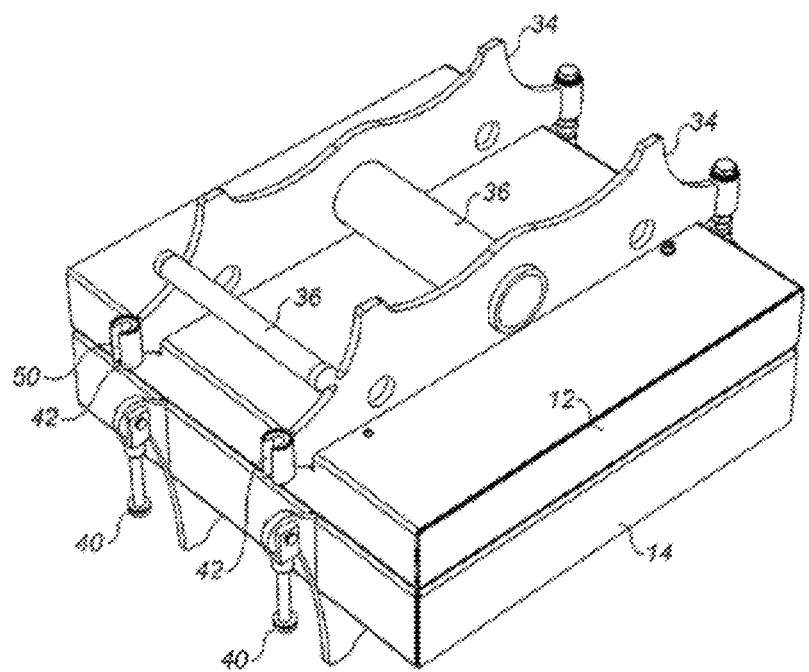
FIG. 4 is a perspective view of the molding machine in the closed position for use in the method for producing the formed composite product of FIG. 1.
Figure 5:
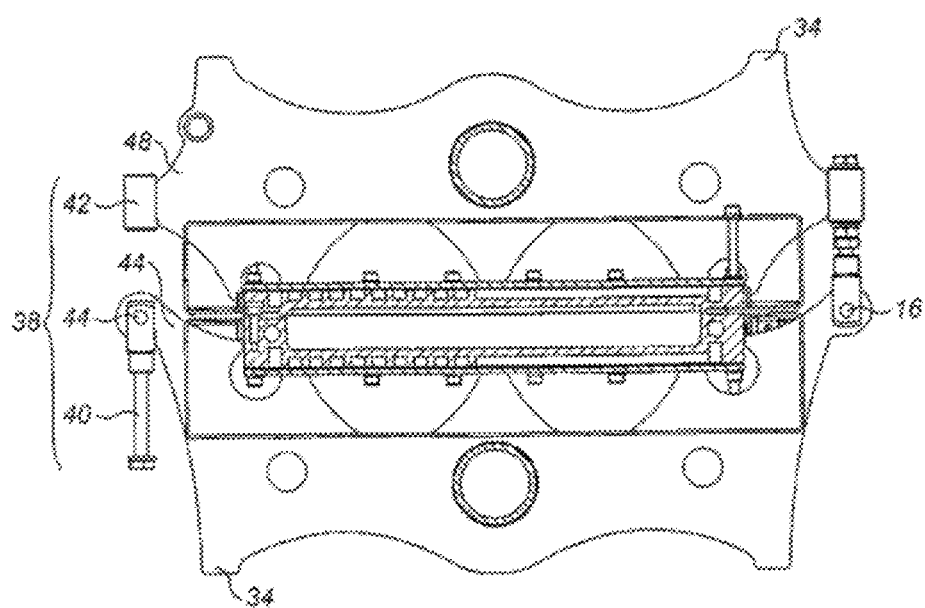
FIG. 5 is a cross-sectional view of the molding machine of FIG. 4, without any materials present in the formed closed cavity of the mold.

In one aspect, and as described in US Publication No. 2011/0081516 to Stillwell et al., the entire disclosure of which is incorporated herein by reference and which is described in more detail below, a system and process for creating composite building products is provided that can efficiently produce composite building products as described herein. As described in Stillwell, composite building products can be produced through the use of a machine 10 that has a pair of hingedly-connected female molds 12, 14 that are configured to be selectively heated and cooled. As shown, the female molds are configured to be selectively moved about and between an open position, as shown in FIG. 3, and a closed position, as shown in FIG. 4, in which the female molds can be clamped together for a desired cure period. Operationally, a reclaimed particulate material 60 is placed into each mold 12,14 when they are in an open position and the molds are heated to a temperature sufficient to raise the reclaimed particulate material above reclaimed particulate materials melting point to form respective mold skins 58, 60 that line the interior surface of the interior cavity of each mold. Next, an expandable filler material 62 is placed in one of the mold cavities and the two molds are clamped closed to form a completely closed cavity. As one will appreciate, the mold skins in the respective molds become integrally bonded together to form a continuous exterior skin 66 that completely encases the filler material.

Figure 2:
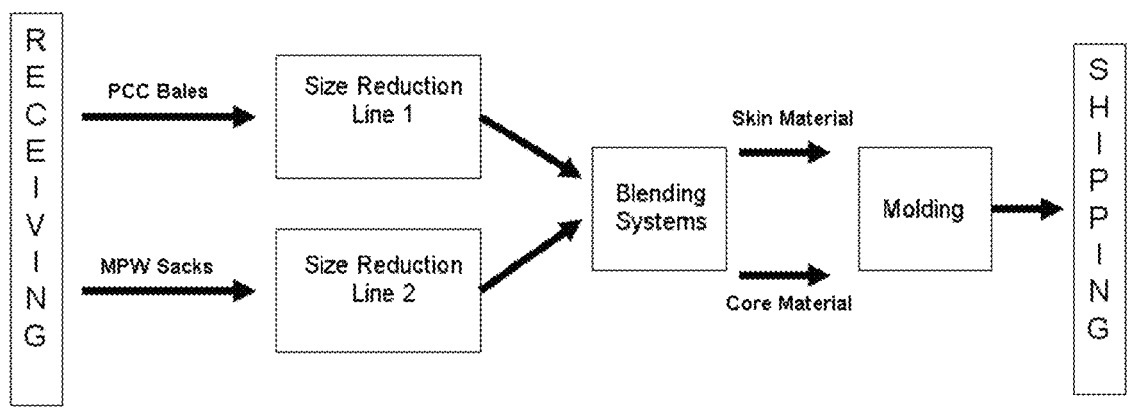
FIG. 2 is a schematic flow chart of a process for producing the first particulate material for use in the production of the composite product and showing post consumer carpet (PCC) material being feed into a size reduction line and mixed plastic waste (MPW) material being feed into a size reduction line. In one aspect, MPW materials can comprise floaters (PP, HPE, and the like) from a conventional float/sink separation process.

In various aspects, the reclaimed particulate material for use in the described method to produce the composite building product 1 can comprise a mixture of reclaimed carpet waste material and mixed plastic waste materials. Referring to FIG. 2, it is contemplated that reclaimed carpet waste can be provided to the system 100 in the form of bales. In general, bales are the end product of a compaction process that is used to decrease the volume that a material occupies by increasing the density and weight. Bales are typically bound with bands or wire to keep the baled material from separating and are typically rectangular, square, round, and the like in shape. As one will appreciate, baled carpet waste can enhance the ease of the delivery and movement of the carpet waste. It is also contemplated that landfill owners and/or operators can also provide incentives for baling of carpet to reduce the volume requirement of the landfill. Optionally, the reclaimed carpet waste can be provided to the system 100 in a loose or otherwise non-compacted condition.

Once the reclaimed carpet waste is provided, the carpet waste can be mechanically treated under conditions effective to separate at least a portion of the desired polymeric component from the inorganic filler present in the reclaimed carpet waste. The mechanical separation of the reclaimed carpet waste materials results in a stream of reclaimed particulate carpet waste material. In one aspect, the reclaimed inorganic filler composition can be reused in another material or process. For example, materials other than carpeting materials that typically can use recovered calcium carbonate material as an inorganic filler include, without limitation, the composite building product of the present disclosure, roofing materials, road paving materials, awnings, and tarps.

The stream of reclaimed particulate carpet waste material can be moved to a storage unit, such as a silo, for intermediate storage prior to the select delivery of the stream of reclaimed particulate carpet waste material to a blending subsystem. It is contemplated that the stream of reclaimed particulate carpet waste material can be mixed with another stream of reclaimed particulate mixed plastic waste materials, at desired weight percentages, to create a desired composition of the reclaimed particulate materials 60 that will be used to form the exterior skin and, optionally, the interior core of the composite building products.

Referring back to FIG. 2, once the reclaimed carpet waste is provided, the reclaimed carpet waste can be directed to a first size reduction line of the system 100. The first size reduction line can comprise conventional conveyors, cleaners, and size reduction devices that are configured to reduce the reclaimed carpet waste in a desired particulate size. For example and without limitation, an exemplary first size reduction line of the system 100 can comprise a bale prep lift table which can be the position at which the baled carpet waste material is initially placed. In one aspect, the bale prep lift table can be configured to raise the carpet bales up to the height of a bale in feed conveyor. In one aspect, the bale prep lift table can be a heavy duty lift table that is configured to accept fork lift fed bales of carpet waste material, allow manual removal of the bale wires/bands, and subsequently lift the bales onto the bale in feed conveyor. Optionally, it is contemplated that the carpet bales can be directly fork lifted thereunto the bale in feed conveyor without the need for the bale prep lift table. In another aspect, it is contemplated that the bales may be directly placed therein a downstream shredder, such as the first shredder described below. In one aspect, the bale wires/bands will be removed with the bales prior to processing.

The bale in feed conveyor can be configured as a mechanical conveyance system to deliver and position the carpet bales appropriately for movement into the first shredder. The first shredder is configured to break up the bales of carpet and to cut the carpet waste material into smaller pieces. It is contemplated that the first shredder can either shred, tear, cut, or grind the fabric material to reduce the size of the pieces of fabric material. In one aspect, it is contemplated that the first shredder can break up at least a portion of any metallic urban debris in preparation for its later downstream removal. In one exemplary aspect, and not meant to be limiting, the first shredder can be a conventional SSI model shredder, a Tria model shredder, a Vecoplan model shredder, and the like. However, other types of devices capable of "sizing" or reducing the size of the pieces of carpet waste material by shredding, cutting, tearing, or grinding also can be used. In one non-limiting aspect, the first shredder is can be configured to shear or reduce the reclaimed carpet waste materials into sizes that are less than about 15 in$^2$, less than about 10 in$^2$; less than about 5 in$^2$; or preferably less than about 1 in$^2$.

Subsequently, the reduced material produced by the first shredder can be conveyed to a vibratory separator or optionally a hammermill. In one aspect, it is contemplated that the reduced material can be conveyed by a draglink conveyor, such as, for example and without limitation, an inclined draglink conveyor, to the vibratory separator or hammermill, which can be optionally elevated with respect to the first shredder. The vibratory separator or hammermill can be configured to vibrate the reduced material and to initially start the process of separating the mechanically separable components of the reclaimed carpet waste materials. In the vibratory separator or hammermill, at least a portion of the reclaimed inorganic filler materials and accumulated post-consumer dirt present in the reclaimed carpet waste materials can be separated from the carpet waste materials. Optionally both the vibratory separator and hammermill can be used sequentially to aid in the desired degree of separation of the at least a portion of the reclaimed inorganic filler materials and accumulated post-consumer dirt present in the reclaimed carpet waste materials.

The remaining carpet waste materials exiting the vibratory separator can be subsequently directed into an air separator that is configured to separate at least a portion of the heavy urban debris materials that were otherwise trapped within the carpet waste materials that were delivered to the system 100. In one exemplary aspect, and not meant to be limiting, the air separator can be a Forsberg air separator that is configured to operate with a continuous air flow loop. In this exemplary aspect, air can flow up and carry the lighter materials, i.e., the reduced size reclaimed carpet waste materials, and allow the heavy urban debris, such as metal pieces, and the like, to fall to a heavy waste storage unit. In a further aspect, it is contemplated that oversized and fused carpet materials can also be removed in the air separator 35 and directed to the heavy waste storage unit. Optionally, other types of devices capable of separating heavy or metallic materials from the carpet waste materials exiting the vibratory separator, such as, for example and without limitation, industrial magnets and the like, can be used.

The reclaimed carpet waste materials exiting the air separator can be subsequently directed into second shredder for further reduction of the carpet waste composition to a reduced size. In one exemplary aspect, and not meant to be limiting, the second shredder can be a conventional SSI model shredder, a Tria model shredder, a Vecoplan model shredder, and the like. However, other types of devices, such as, for example and without limitation, knife mills, granulators, and the like, capable of "sizing" or reducing the size of the pieces of carpet waste material to the desired size by shredding, cutting, tearing, or grinding also can be used. In one non-limiting aspect, a grinder type shredder can be configured to shred the carpet waste materials and to pass the appropriately sized materials through a screen having a plurality of predetermined sized apertures. In one aspect, the exemplified Vecoplan shredder is configured to shear or reduce the reclaimed carpet waste materials into sizes that can pass through a screen having apertures having a dimension less than about 15 mm, less than about 12 mm; or preferably less than about 10 mm.

The reclaimed carpet waste materials exiting the second shredder can be directed to pass through a cleaning system, such as the vibratory and air separator described above, before being directed to an intermediate storage silo or directly to a downstream agglomerator. Suitable agglomerators include Condux agglomerators, Netplasmak NPS agglomerators, Pallman Industries agglomerators, Herbold Industries, agglomerators, or tub densifiers. As one will appreciate, the downsized pieces of reclaimed carpet waste materials exiting the second shredder should be of a size suitable for agglomeration, which will depend on the agglomeration equipment employed.

Optionally, the process for reducing reclaimed carpet waste materials to a size suitable for agglomeration can comprise an initial size reduction in a conventional shredder, subsequent processing in a first conventional cleaning system, such as, for example and without limitation, the vibratory and air separator described above, a step cleaner, a condenser, a willow, and the like, subsequent processing through a conventional hammermill, and subsequent processing in a second conventional cleaning system. Optionally, the process can further comprise passing the waste stream through an additional conventional size reduction system, such as, for example and without limitation, a knife mill, a granulator, and the like, and then subsequently into a third conventional cleaning system It is also contemplated that the processes described herein can further comprise additional separation and cleaning steps as required or desired. For example, additional passes through hammermills and cleaning systems can be used depending on the desired degree of dirt removal from the reclaimed carpet materials.

As one skilled in the art will appreciate, a conventional vertical or horizontal hammermill is well suited for the desired degree of material reduction. As one will appreciate, upon initial separation of the carpet waste material from the carpet bale, the reclaimed carpet waste materials still contain most of the $CaCO_3$/latex that originally resided in the carpet waste materials as well as other "dirt" that is entangled with fiber segments of the waste material. Because conventional hammermills are typically high RPM machines that have flailing fingers or hammers that are configured to strike the entering waste carpet material and thereby impart a significant kinetic shock to the waste carpet material, multiple passes through one or more hammermills will cause a size reduction on the waste carpet material as well as a degree of separation of the filler materials, such as the exemplarily noted $CaCO_3$/latex material and a degree of separation of the other "dirt" materials.

As one of ordinary skill in the art can appreciate, subjecting the reduced reclaimed carpet waste materials to an agglomeration process loosely fuses thermoplastic materials together into an irregular and inconsistent granular format. The step of agglomerating the reclaimed carpet waste material fragments involves using mechanical energy to densify the components of the reclaimed carpet waste material fragments into smaller and denser granules. During agglomeration, some of the synthetic reclaimed carpet waste material components are mechanically melted. In some embodiments, no heat is added during agglomeration; however, frictional forces cause the reclaimed carpet waste material components to heat up to a desired temperature at which the material in the reclaimed carpet waste material components with the lowest glass transition temperature achieves the desired temperature, at which point the reclaimed carpet waste material components become soft/malleable enough to pass through a downstream agglomeration die. Lower melting reclaimed carpet waste material components include any components that melt or otherwise become malleable as a result of the mechanical mixing during the agglomeration process, and in some embodiments can include polyethylene and polypropylene. Agglomeration may also include further reduction in the size of the reclaimed carpet waste material fragments, and particularly of the high melting components. For example, in some embodiments high melt temperature plastics, such as and without limitation, polyester, Nylon, and the like, does not melt, but is reduced to a powder. During agglomeration, high melt temperature plastics may be encapsulated by the lower melting components, such as polyethylene and polypropylene. The rate of agglomeration depends on a variety of factors including at least the size of the reclaimed carpet waste material fragments and the composition of the reclaimed carpet waste material fragments. In some embodiments, the rate of agglomeration is from 500 to about 7500 lbs/hour, or from about 1000 to about 6000 lbs/hour, or from about 1500 to about 5000 lbs/hour. In one embodiment, the agglomeration process produces granules of agglomerated material.

As an example of the agglomeration process, in one embodiment, downsized reclaimed carpet waste material is fed into an agglomerator, such as, and without limitation, an agglomerator manufactured by Condux, by hand or by belt into a final shredder which cuts the reclaimed carpet waste material fragments into smaller pieces. In this agglomerator, the shredder uses a rotary blade inside a steel box to cut the downsized material into smaller pieces. These smaller pieces are then transferred to a holding box where the material falls through a screen which allows through only pieces of a set size or smaller. The larger pieces are blown back to the shredder to be further downsized. As the material passes through the screen it is fed into a screw or auger which feeds the material between two steel plates that face each other, one twists and the other is stationary. The plates are shaped to have room in the center and are close together at the edge which generates friction and heat to soften the material. As the material softens it combines with any other material present. The combination of materials is pushed out of the plates as a strand or in small pieces which can be further downsized if needed. No heat is added during the process; however, the material can reach temperatures ranging from approximately 250° F. to 400° F. due to the frictional mechanical energy. The agglomerated pieces are passed through small holes in an exterior die. At this point, the agglomerated reclaimed carpet materials are either clipped by a rotating knife (such as used in exemplary Pallmann Industries agglomerators) and then fed into a hot granulator for size reduction of any particles that are sticking or clumped together or agglomerated reclaimed carpet materials is transferred as a strand directly to a granulator (such as used in exemplary Herbold Industries agglomerators).

Subsequent to the agglomeration and granulation process, the resulting granulate of the reclaimed carpet materials is partially cooled, such as by air flow, and it transferred to pulverizer that is configured for "sizing" or reduce the size of the granulate of the reclaimed carpet materials to the desired size by grinding. It is contemplated that desired size of the reclaimed particulate carpet waste material produced by the pulverizer will be of between about 1-500 mesh, preferably between about 3-400 mesh, and more preferred between about 5-300 mesh. In one aspect, it is contemplated that the preponderance of reclaimed particulate carpet waste material produced by the pulverizer will be larger than between about 50-150 mesh, preferably larger than between about 60-130 mesh, and more preferred larger than between about 80-120 mesh. Optionally, if the reclaimed carpet materials are run through the exemplifed size reduction process without one or more of the intermediate cleaning steps, it is contemplated that the ratio of very fine powder (smaller than 80 mesh) present in the reclaimed particulate carpet waste material produced by the pulverizer will increase due to the higher concentrations of inorganic fillers, such as calcium carbonate. The stream of reclaimed particulate carpet waste material produced by the pulverizer can be moved to a storage unit, such as a silo, for intermediate storage prior to the select delivery of the stream of reclaimed particulate carpet waste material to the blending subsystem.

The stream of reclaimed particulate mixed plastic waste materials can comprise at least one polymeric material selected from the group comprising recycled container materials, recycled plastic bottle waste materials, virgin polymer materials, and the like. In one aspect, the polymeric material generated from mixed plastic waste materials can comprise at least one polymeric material selected from the group comprising HDPE, LDPE, PP, PET, and the like.

In conventional plastic waste recycling operations, it is known to separate components in the waste stream by polymer density. Conventionally, such as, for example in recycled container or bottle recycling lines, mechanical means are provided to separate all non-PET materials away from the PET materials. The non-PET materials can comprise, LDPE, HDPE, PP, and trace amounts of other types of polymeric materials, such as, for example and without limitation, PVC. However the conventional mechanical separation of the PET materials from the non-PET components from the mixed plastic waste materials waste stream allows for significant quantities of undesirable polymer(s) to make it through the initial mechanical separation process.

In order to effect the desired degree of separation of the PET materials from the non-PET components, it is known in the art to use a conventional float/sink separation process. In this process the plastic waste, which may be introduced after being mechanically separated as described above and after being otherwise reduced to a smaller flake form, is fed into tank filled with water and other additives. As the PET materials in the reduced mixed plastic waste materials is significantly denser (0.050 lbs/cubic in) than the PP components (0.032 lbs/cubic in) and the PE components (0.034 lbs/cubic in) present in the reduced mixed plastic waste materials, the PET materials "sinks" to the bottom (where it is conventionally harvested) and the "floating" PP, PE, HDPE and the like components remain on the surface for separate harvesting.

The recovered "floatable" polymeric waste materials are run through at least one size reduction line to effect a generally consistent particulate size. It is contemplated that desired size of the reclaimed mixed plastic waste material produced by the reduction line will be of between about 1-150 mesh, preferably between about 5-80 mesh, and more preferred between about 10-50 mesh. As one skilled in the art will appreciate, the at least one size reduction line can comprise a conventional pulverizer, a jet mill, and the like that is configured to process low melt polymers. As shown in FIG. 2, the stream of reclaimed particulate mixed plastic waste material produced by the at least one size reduction line can be moved to a storage unit, such as a silo, for intermediate storage prior to the select delivery of the stream of reclaimed particulate mixed plastic waste material to the blending subsystem.

In the blending subsystem, it is contemplated that the reclaimed particulate material 60 for use in forming the exterior skin of the composite building product can be created by mixing a desired proportional amount of the reclaimed particulate carpet waste material (which may comprise polypropylene PCC) and the reclaimed particulate mixed plastic waste material. In various aspects, it is contemplated that the reclaimed particulate carpet waste material can comprise between about, 10-100% by weight, preferably between about 20-85% by weight, and more preferred between about 30-70% by weight of the reclaimed particulate material 60 and the reclaimed particulate mixed plastic waste material can comprise between about, 10-100% by weight, preferably between about 20-85% by weight, and more preferred between about 30-70% by weight of the reclaimed particulate material 60. The resultant blended stream of particulate material 60 can be moved to a storage unit, such as a silo, for intermediate storage prior to the select delivery of the particulate material 60 to the machine 10.

In another aspect, it is contemplated that the particulate material 60 used for forming the exterior skin of the composite building product can comprise at least one additive. Without limitation, exemplary additives can comprise: UV stabilizers, flame retardants (FR), antifungals (AF), polymeric compatibilizors, colorants/dyes, anti odor materials, and the like. In various aspects, it is contemplated that at least one additive can comprise between about, 0.5-15% by weight, preferably between about 0.75-10% by weight, and more preferred between about 1-5% by weight of blended stream of the particulate material 60. In another aspect, it is contemplated that at least one of the materials forming the stream of particulate material 60 used for forming the exterior skin of the composite building product can comprise thermoset materials.

In one aspect, it is contemplated that the expandable interior core can be comprised of at least two materials: reclaimed carpet waste material (which may comprise polypropylene PCC, Nylon PCC, and the like) and the reclaimed mixed plastic waste material. In this aspect, reclaimed particulate carpet waste material can be formed using the same methodology described above for forming the reclaimed particulate carpet waste material that is used in the exterior skin. Optionally, reclaimed particulate carpet waste material can be formed using the same methodology described above for forming the reclaimed particulate carpet waste material that is used in the exterior skin but the final pulverization step is not used. As one skilled in the art will appreciate, when processing PET or NYLON PCC as described above, only the polypropylene element of the PCC will achieve glass transition temperature. Once the polypropylene achieves this state, the polypropylene can pass out of or otherwise escape the agglomeration die, carrying entrapped unmelted PET or NYLON along with it. In this aspect, the stream of reclaimed particulate carpet waste material produced after the agglomeration and granulation step can be moved to a separate storage unit, such as a silo, for intermediate storage prior to the select delivery of the stream of reclaimed particulate carpet waste material to the separate blending subsystem used to mix the materials used in the interior core.

It is contemplated that desired size of the reclaimed particulate carpet waste material suitable for use in the interior core will be of between about 0.3-20 mm, preferably between about 0.7-15 mm, and more preferred between about 1-10 mm. In one aspect, it is contemplated that the preponderance of reclaimed particulate carpet waste material produced by the agglomerator will be larger than between about 0.5-9 mm, preferably larger than between about 1-6 mm, and more preferred larger than between about 2-4 mm.

In one aspect, reclaimed particulate mixed plastic waste material suitable for use as an interior core material can be formed using the same methodology described above for forming the reclaimed particulate mixed plastic waste material that is used in the exterior skin. As discussed above, recovered "floatable" polymeric waste materials are run through at least one size reduction line to effect a generally consistent particulate size. It is contemplated that desired size of the reclaimed mixed plastic waste material produced by the reduction line will be of between about 5-200 mesh, preferably between about 10-100 mesh, and more preferred between about 20-80 mesh. As one skilled in the art will appreciate, the at least one size reduction line can comprise a conventional pulverizer, a jet mill, and the like that is configured to process low melt polymers. As shown in FIG. 2, the stream of reclaimed particulate mixed plastic waste material produced by the at least one size reduction line can be moved to a storage unit, such as a silo, for intermediate storage prior to the select delivery of the stream of reclaimed particulate mixed plastic waste material to the blending subsystem used to mix the materials used in the interior core.

In the blending subsystem, it is contemplated that the reclaimed particulate material for use in forming the interior core of the composite building product can be created by mixing a desired proportional amount of the reclaimed particulate carpet waste material and the reclaimed particulate mixed plastic waste material. In various aspects, it is contemplated that the reclaimed particulate carpet waste material can comprise between about, 10-99% by weight, preferably between about 20-85% by weight, and more preferred between about 30-70% by weight of the reclaimed particulate material for use in forming the interior core and the reclaimed particulate mixed plastic waste material can comprise between about, 10-90% by weight, preferably between about 20-80% by weight, and more preferred between about 30-70% by weight of the reclaimed particulate material for use in forming the interior core. The resultant blended stream of particulate interior core material can be moved to a storage unit, such as a silo, for intermediate storage prior to the select delivery of the particulate interior core material to the machine 10.

It is contemplated that the expandable interior core can further comprise a chemical blowing agent. In various aspects, the chemical blowing agent can be mixed or otherwise blended with the blending subsystem used to mix the materials used in the interior core. In various aspects, it is contemplated that the chemical blowing agent can comprise between about, 0.5-10% by weight, preferably between about 0.75-7.5% by weight, and more preferred between about 1-5% by weight of the blended stream of particulate interior core material for use in forming the interior core.

In another aspect, it is contemplated that the blended stream of particulate interior core material used for forming the interior core of the composite building product can comprise at least one additive. Without limitation, exemplary additives can comprise: UV stabilizers, flame retardants (FR), antifungals (AF), polymeric compatibilizors, colorants/dyes, anti odor materials, and the like. In various aspects, it is contemplated that at least one additive can comprise between about, 0.5-15% by weight, preferably between about 0.75-10% by weight, and more preferred between about 1-5% by weight of blended stream of the particulate material 60. In another aspect, it is contemplated that at least one of the materials forming the blended stream of particulate interior core material used for forming the interior core of the composite building product can comprise natural or manmade fibers.

Optionally, it is contemplated that non-melting fillers such as, without limitation, wood, inert fillers such as CaCO3, any other exemplary fillers described herein above, and the like can be added to the blended stream of particulate interior core material used for forming the interior core of the composite building product. Optionally, the composite building product can further comprise an aesthetic/wear layer and/or a base layer, which can be an adhesive or insulating layer. In certain embodiments, the aesthetic/wear layer and the base layer can be formed or otherwise configured to be suitable for use in similar or identical applications.

Referring again to US Publication No. 2011/0081516 and to FIGS. 3-6f, an exemplified process for molding desired composite building product uses a machine 10 that comprises a pair of opposed molds 12, 14, each mold defining a mold cavity 22, 24, the molds being configured via hinge 16 to be movable between an open position shown in FIG. 3 in which the mold cavities are exposed and a closed position shown in FIG. 4 in which the molds are positioned in sealed opposition to define a completely closed mold cavity. As exemplarily shown the mold cavities 22, 24 are substantially square. In one aspect, the upper mold cavity 22 is shallow, with an exemplary depth of 0.25 inch, while the lower mold cavity 24 is deeper, with an exemplary depth of 0.75 inches. As one will appreciate, in the closed position the exemplary sized molds 12, 14 cooperate to define an entirely closed mold cavity that is approximately 1.00 inch deep and without any vent means to the atmosphere. As one will appreciate however, the exemplary dimensions are not meant to be limiting. This it is contemplated that the described machine and the materials used therein to form the composite building products are particularly suitable for producing large-area plate members with dimensions of more than 12 inches along each side and with a thickness of more than 6 inches.

Means are provided to selectively heat or cool the respective molds to desired temperatures. In one aspect, channels are defined in the respective molds and are placed in fluid communication to an external source of fluid (not shown) which can be selectively heated or cooled to heat or cool the molds by conduction. Such devices for supplying heated or cooled fluid, such as oil for example, are well-known and therefore will not be described in further detail here. It is contemplated that each mold can be seated within an insulating jacket 30, 32, which can be formed of thermally conducted material such as aluminium or steel. In one aspect, the insulating jackets 30, 32 can be configured with a reinforcement structure of ribs 34 and interconnecting beams 36 to help prevent buckling of the mold halves 12,14 during the operative use of the machine.

Clamping means 38 can be provided on the upper and lower mold halves 12,14, on the opposite side to the location of the hinges 16, for securing the mold halves 12,14 together when in the closed position. In one exemplary aspect, the clamping means 38 can comprise a pair of bolts 40 and a cooperative pair of collars 42. Each bolt 40 can be connected at one end to a projection 44 of the reinforcing ribs 34 on the lower mold half 14, by a pivot 44 and each collar 42 defines has an axially extending slot 50 and can be secured to a projection 48 of the reinforcing rib 34 on the upper mold half 12. In the closed position, the bolts 40 initially hang downwards as seen in FIG. 4, but are configured to pivot clockwise to pass through the slots 50 of the collars 42 for manual and selective tightening, thereby selectively clamping the upper and lower mold halves 12, 14 together.

In operation, and referring now to FIGS. 6a-f, which illustrate the parts of the molds 18,20 defining the mold cavities 22, 24, with other parts being omitted for clarity. Initially, the upper and lower mold halves are in the open position shown in FIG. 3. The molds 18, 20 are heated by circulation of heated oil through the channels 26, 28 to a temperature higher than the melting point of at least a portion of the reclaimed particulate carpet waste material and the reclaimed particulate mixed plastic waste material forming the stream of particulate material 60 that is to be used to form the exterior skin of the composite building product. For example, for a described weight mixture of the reclaimed particulate carpet waste material and the reclaimed particulate mixed plastic waste material forming the stream of particulate material 60, the molds 18, 20 can be heated up to about 240° C., preferably up to about 220° C., and more preferred up to about 200° C.

Figure 6A:
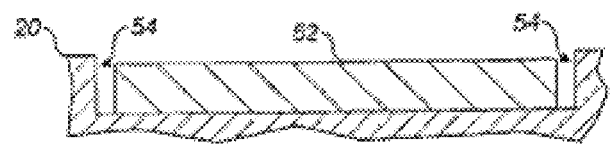
FIGS. 6a-6f are partial schematic diagrams of parts of the molds showing the molding process.
Figure 6B:
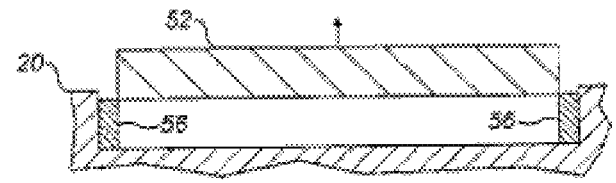
Figure 6C:
Figure 6D:

In one example, a form 52, which is formed of a material with a low thermal conductivity, such as, for example and without limitation, wood and the like, is placed into the lower mold cavity 24 as shown in FIG. 6a. As shown, it is contemplated that the form 52 is slightly smaller than the mold cavity 24 and is positioned approximately centrally, which leaves a defined gap 54 between the form 52 and the side walls of the cavity 24. The particulate material 60 is poured into this gap and melts upon contact with the heated mold 24, which causes a polymeric wall 56 to form around the respective sides of the mold cavity 24. It is contemplated that the form, being made from a material that the molten particulate material 60 the form tends not to adhere to, can be removed and additional particulate material 60 can be poured into the open mold cavity 24 to cover the base of the cavity. This particulate material 60 melts upon contact with the heated mold 20 and joins with the polymeric sidewall 56 to form a continuous polymeric skin 58 that lines the mold cavity 24 as shown in FIG. 6c. Separately, and as shown in FIG. 6d, particulate material 60 is poured into the mold cavity 22 to form a polymeric skin that lines the mold cavity. This step can optionally be completed without using the two-step form methodology described above.

Figure 6E:
Figure 6F:

Subsequently the foamable filler material 62, i.e., the particulate interior core material, is placed into the cavity of the polymeric skin 58 which has been formed in the lower mold cavity 24. If desired, the filler material 62 may be layered up with at least one structural layer of other materials 64 to give special properties to the finished product, as shown in FIG. 6e. For example and without limitation, it is contemplated that the at least one structural layer can be selected from: ballistic paneling, fiberous pads, woven fabrics, non-woven fabrics, post consumer carpet pieces, metal reinforcing members, pipes, metal fencing, metal bracing, wood boards or strips, metal fencing, and bubble wrapping.

After the particulate interior core material has been added, the upper mold 18 is rotated about the hinges 16 into the closed position on top of the lower mold 20 and the clamping means 38 is operated to secure the mold halves together. As one will appreciate, the polymeric skin formed in the upper mold cavity 22 seamlessly bonds to the polymeric skin 58 formed in the lower mold cavity 24 to provide a continuous exterior skin 3, which completely encases the foamed interior core. As one will appreciate, in the closed position, pressure is exerted on the exterior skin 2 while the expanding filler material simultaneously exerts pressure on its interior thereby ensuring the polymeric skins completely seal around the interior core to form the continuous exterior skin 3

As known, the foaming agent in the particulate interior core material can be activated by the residual heat of the molds 18, 20 to effect expansion to completely fill the exterior skin 3. Once in the closed position, circulation of heated fluid, such as oil, through the channels 26, 28 can be stopped and circulation of cooling fluid, such as oil, can be selectively initiated to start the process of cooling the molds 18,20. The foamable filler material will stop expanding when the temperature of the interior cavity drops below a certain threshold. The molds 18,20 can be cooled further until a temperature is reached at which point the mold halves 18, 20 can be opened and the finished composite building product is removed. As one skilled in the art will appreciate, foaming can be achieved via the use of conventional foaming means, such as the conventional use of physical gassing, such as, for example and without limitation, Carbon Dioxide, Nitrogen, and the like).

In one aspect, the composite building product requires no further finishing. As one will appreciate, the surface of the respective walls of the mold cavities 22, 24 can have any desired texture, which will effect a corresponding impression into the exterior skin of the formed composite building product. In another aspect, the tight clamping of the mold halves 12,14 together, and lack of any vents in the mold cavity, helps to ensure a substantially seamless join between the upper and lower plastic skins with no flash required to be subsequently removed.

Optionally, the composite building product can further comprise an aesthetic/wear layer 2 and/or a base layer 4, which can be an adhesive or insulating layer. In certain embodiments, the aesthetic/wear layer 2 and the base layer 4 can be formed or otherwise configured to be suitable for use in similar or identical applications. It is optionally contemplated that additional layers or parts can be added to selected portions of the exterior skin of the formed composite building product in additional post molding steps to improve the performance of the composite building product in at least one of categories of aesthetics, durability, stability/strength, thermal/UV protection, anti-graffiti protection, anti-slip protection, weather resistance protection, rot resistance protection, insect resistance protection, soil-releasing protection, and the like. In another aspect, any desired portion of the exterior surface of the exterior skin of the formed composite building product can be selectively is coated or ink printed with additional layers in additional post molding steps to improve the performance of the composite building product in at least one of categories of aesthetics, durability, stability/strength, thermal/UV protection, anti-graffiti protection, anti-slip protection, weather resistance protection, rot resistance protection, insect resistance protection, soil-releasing protection, and the like Of course, it is contemplated that the process can be carried out manually but is equally suitable for mechanization with the various operations being carried out by the use of hydraulic systems, cranes or robots etc.

The preceding description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Other embodiments of the invention will be apparent to those skilled in the art from consideration of the specification and practice of the invention disclosed herein. Thus, the preceding description is provided as illustrative of the principles of the present invention and not in limitation thereof. It is intended that the specification and examples be considered as exemplary only, with a true scope and spirit of the invention being indicated by the following claims.

What is claimed is:

1. A composite building product comprising:
a continuous polymeric skin comprising melted particulate waste materials that comprise melted particulate reclaimed carpet waste materials and melted particulate mixed plastic waste materials, wherein the continuous polymeric skin defines an interior cavity; and
a foamed core positioned within the interior cavity that is surrounded by and completely encased by the skin,
wherein the melted particulate reclaimed carpet waste materials comprise a thermoplastic fibrous polymer, a carpet backing material, and an adhesive, wherein the melted particulate mixed plastic waste materials comprise at least one polymeric material selected from the group consisting of recycled container materials and recycled plastic bottle waste materials, and wherein the melted particulate reclaimed carpet waste materials comprise between about 30 to 70 percent by weight of the melted particulate waste materials and the melted particulate mixed plastic waste materials comprise between about 30 to 70 percent by weight of the melted particulate waste materials.

2. The composite building product of claim 1, wherein the recycled container materials comprise at least one polymeric material selected from the group consisting of high density polyethylene (HDPE), low density polyethylene (LDPE), polypropylene (PP), and polyethylene terephthalate (PET).

3. The composite building product of claim 1, wherein the recycled plastic bottle waste materials comprise at least one polymeric material selected from the group consisting of high density polyethylene (HDPE), low density polyethylene (LDPE), polypropylene (PP), and polyethylene terephthalate (PET).

4. The composite building product of claim 1, wherein the skin further comprises at least one additive and virgin polymer materials.

5. The composite building product of claim 4, wherein the virgin polymer materials of the skin comprise at least one polymeric material selected from the group consisting of high density polyethylene (HDPE), low density polyethylene (EDIT), polypropylene (PP), and polyethylene terephthalate (PET).

6. The composite building product of claim 4, wherein the at least one additive of the skin is selected from the group consisting of UV stabilizers, flame retardants (FR), antifungals (AF), polymeric compatibilizor, colorants/dyes, and anti odor materials.

7. The composite building product of claim 1, wherein the melted particulate reclaimed carpet waste materials further comprise at least one type of impurity, and wherein at least one of the at least one type of impurity is selected from the group consisting of dirt, sand, oil and inorganic filler.

8. The composite building product of claim 4, wherein the skin comprises between 1-15% additives.

9. The composite building product of claim 1, wherein the skin further comprises thermoset materials.

10. The composite building product of claim 1, further comprising at least one wear layer coupled to a top surface of the skin.

11. The composite building product of claim 1, further comprising at least one base layer coupled to a bottom surface of the skin.

12. The composite building product of claim 1, further comprising at least one structural layer disposed therein the foamed core.

13. The composite building product of claim 12, wherein the at least one structural layer is selected from the group consisting of: fibrous pads, woven fabrics, non-woven fabrics, post consumer carpet pieces, metal reinforcing members, pipes, wood boards or strips, metal fencing, and bubble wrapping.

14. The composite building product of claim 1, wherein the foamed core further comprises at least one additive, and wherein the at least one additive is selected from the group consisting of UV stabilizers, flame retardants (FR), antifungals (AF), polymeric compatibilizor, colorants/dyes, and anti odor materials.

15. The composite building product of claim 1, wherein the foamed core comprises between 1-99% post consumer carpet material.

16. The composite building product of claim 1, wherein the foamed core comprises between 1-80% particulate mixed waste material.

17. The composite building product of claim 1, wherein the foamed core comprises between 1-10% chemical blowing agents.

18. The composite building product of claim 1, wherein the foamed core comprises between 1-5% chemical blowing agents.

19. The composite building product of claim 14, wherein the foamed core further comprises natural or manmade fibers.

20. The composite building product of claim 1, wherein the melted particulate reclaimed carpet waste materials further comprise at least one filler.

21. A composite building product comprising:
a continuous polymeric skin comprising melted particulate waste materials that comprise melted particulate reclaimed carpet waste materials and melted particulate mixed plastic waste materials, wherein the continuous polymeric skin defines an interior cavity; and
a foamed core positioned within the interior cavity that is surrounded by and completely encased by the skin,
wherein the melted particulate reclaimed carpet waste materials comprise at least one type of impurity selected from the group consisting of dirt, sand, oil, and inorganic filler, wherein the melted particulate mixed plastic waste materials comprise at least one polymeric material selected from the group consisting of recycled container materials and recycled plastic bottle waste materials, and wherein the melted particulate reclaimed carpet waste materials comprise between about 30 to 70 percent by weight of the melted particulate waste materials and the melted particulate mixed plastic waste materials comprise between about 30 to 70 percent by weight of the melted particulate waste materials.

22. The composite building product of claim 21, wherein the melted particulate reclaimed carpet waste materials further comprise a thermoplastic fibrous polymer.

23. The composite building product of claim 21, wherein the melted particulate reclaimed carpet waste materials further comprise a carpet backing material.

24. The composite building product of claim 21, wherein the melted particulate reclaimed carpet waste materials further comprise an adhesive.

* * * * *